United States Patent [19]

Hilaire et al.

[11] Patent Number: 4,694,063
[45] Date of Patent: Sep. 15, 1987

[54] ANHYDROUS PROCESS FOR THE MANUFACTURE OF POLYAMIDE POWDER FROM LACTAM IN THE PRESENCE OF N,N'-ALKYLENE BIS AMIDE

[75] Inventors: Jean-Claude Hilaire; Roland Guerin, both of Pau, France

[73] Assignee: Atochem, France

[21] Appl. No.: 820,661

[22] Filed: Jan. 21, 1986

[30] Foreign Application Priority Data

Jan. 30, 1985 [FR] France ................................ 85 01274

[51] Int. Cl.⁴ ............................................. C08G 69/16
[52] U.S. Cl. .................................... 528/315; 528/312; 528/323; 524/227
[58] Field of Search ................................ 528/315, 312

[56] References Cited

FOREIGN PATENT DOCUMENTS 5003427 1/1980 Japan ..................................... 528/315

Primary Examiner—Harold D. Anderson
Attorney, Agent, or Firm—Sigalos & Levine

[57] ABSTRACT

A process for the manufacture of a polyamide powder comprising polymerizing in solution a reaction mixture comprising a monomer lactam or lactams capable of generating said polyamide in the presence of an N,N'-alkylene bisamide.

11 Claims, No Drawings

ANHYDROUS PROCESS FOR THE MANUFACTURE OF POLYAMIDE POWDER FROM LACTAM IN THE PRESENCE OF N,N'-ALKYLENE BIS AMIDE

BACKGROUND OF THE INVENTION

Polyamide powders, which have found some significant markets particularly in the area of coatings for metal objects, must have particle sizes suited to their mode of application and their use. Thus, powders applied to metals using the fluidization-dipping technique will have particle sizes on the order of 80–300 microns, those applied by electrostatic powdering will be smaller than 60 microns, and so forth. In many cases, the particle size must remain within narrow limits.

Various techniques have been proposed to produce such powders; including, among others, cryogenic grinding of polyamide granules or hot dissolution of these same granules in a suitable solvent followed by precipitation. In both cases, the polyamide granules must be produced by polymerization of their monomers (salts of diacids and diamines, amino acids, lactams), and the resulting powder must then be selected to produce the desired particle size.

In the case of polyamides whose monomer is a lactam; i.e., essentially polyamide-12 derived from lauryllactam and polyamide-6 derived from caprolactam, original methods have been proposed for converting the lactam directly into a fine polyamide powder. These methods consist in suspending the lactam in an organic liquid (French Pat. No. 1,213,993) or dissolving it in a solvent (German Pat. No. 1,183,680) and by conducting an anionic-type polymerization directly obtaining polyamide powder, which spontaneously separates from the liquid medium as it forms.

Methods for anionic polymerization of lactams are essentially based on the use of a catalyst such as sodium or one of its compounds, such as sodium hydride or sodium methylate and an activator such as the N-carboxyanilide lactams, the isocyanates, the carbodiimides, the cyanimides, the acyllactams, the triazines, the ureas, the N-substituted imides, the esters, and the like.

Use of these processes, which initially seemed intriguing, has led to considerable frustration due to poor yields due to incomplete polymerization, untimely acceleration of the reaction leading to solidification and fouling of the sides of the reactor or the agitators, difficulties in obtaining or reproducing a given particle size, and the like deficiencies. A number of solutions have been proposed to remedy these problems (French Pat. Nos. 1,521,130, 1,601,194, 1,601,195, and 1,602,751; and German Patent Publication No. 1,942,046), such as progressive addition of the catalyst and the activator, temperature-control programming, selection of optimum solvents and others.

Despite all these improvements, none has proved successful and industrial manufacture of these powders has remained just as delicate a process requiring close attention from operating personnel.

SUMMARY OF THE INVENTION

The present invention provides a simplified industrial manufacture procedure for such polyamide powders and produces higher-quality products with improved yields.

Briefly, the present invention comprises a process for the manufacture of a polyamide powder comprising polymerizing in solution a reaction mixture comprising a monomer lactam or lactams capable of generating said polyamide in the presence of an N,N'-alkylene bisamide.

DETAILED DESCRIPTION

Any lactam capable of generating a polyamide can be utilized in the invention. In particular, and illustrative are those which have become industrially important such as caprolactam, enantholactam, capryllactam and lauryllactam.

It is also possible to utilize a mixture of two or more of these lactams which leads to the production of a co-polyamide powder.

It is possible to add a finely divided filler so as to provide crystallization nuclei. This filler can be organic material such as polyamide powder, or mineral material such as silica, talc, and the like materials. It is important that this filler not add any trace of water, with the silica which is shown to be used in the examples hereof having been carefully dehydrated.

It is of course additionally possible to add any other filler (pigments, dyes, and the like) or other additives conventionally added to such polyamide powders, provided they are completely dry and inert with respect to the reaction medium.

The term "N,N'-alkylene bisamide" as used herein means the N,N'-alkylene bisamides of fatty acids, and more particularly still $C_6$ to $C_{22}$ fatty acids. Examples are:

N,N'-ethylene bis stearamide of the formula:

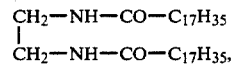

N,N'-ethylene bis oleamide of the formula:

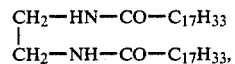

N,N'-ethylene bis palmitamide, gadoleamide, cetoleamide and erucamide, N,N'-dioleyladipamide, and N,N'-dierucylamide.

The quantity of N,N'-alkylene bisamide to be added is between about 0.004 and 4 moles, preferably between 0.075 and 2 moles per 100 moles of lactam.

Addition of such bisamides to the reaction mixture slows the reaction and produces a powder with a very narrow range of particle sizes with a high degree of reproducibility from one operation to another and with no fouling of the reactor.

The yield (rate of conversion of lactam into polyamide) is not affected and remains equal to 100 percent.

Addition of these bisamides also leads to a reduction in the molecular weight of the powder (measured by the viscosity in solution) and, concurrently, to a reduction in particle size, which makes it possible to produce extremely fine powders which could not otherwise be obtained.

The reductions are more pronounced the higher the concentration of bisamide.

It is possible, if necessary, and this is also an object of this invention, to compensate for these reductions by varying the following parameters:

(i) reaction temperature: any increase in temperature between 80° C. and 130° C. will also increase the molecular weight and the particle size, and (ii) catalyst concentration (between 0.8 and 3 moles per 100 moles of lactam), activator concentration and catalyst/activator ratio, an increase in which will lead to an increase in the molecular weight and particle size.

It is also possible to reduce both the molecular weight of the powder and its particle size by reducing the activator injection rate, which is equivalent to increasing the duration of the reaction.

It is also possible, and this is also an object of this invention, to affect the size of the particles without affecting their molecular weight by adjusting the following parameters:

(i) agitation speed: the powder particles will be smaller the higher this speed and vice versa, and (ii) proportion of finely divided filler: the powder particles will be finer the higher this proportion and vice versa.

Some of these parameters will have more effect than others. Thus, a small increase in temperature will produce a considerable increase in viscosity and a small increase in particle size.

It is thus possible, by adjusting all of these factors, to obtain, at will, a powder with a given particle size and a given molecular weight.

In the examples given below to illustrate the invention without, however, limiting it, the tests were conducted in a reactor with a five-liter capacity, fitted with a paddle agitator, a double jacket through which heating oil circulated, a bottom drainage system and a nitrogen-flushed lock for introduction of the reagents.

An azeotropic vacuum distillation system made it possible to eliminate any trace of water from the reaction mixture.

The solvent used was an alkane hydrocarbon fraction with a boiling range between 140° C. and 170° C.

The molecular weight of the resulting polyamide powder was determined by measuring the inherent viscosity at 25° C. of a solution of 0.5 g of this powder in 100 g of m-cresol.

The particle size (average particle diameter) was measured using a Coulter counter.

For convenience, the following abbreviations are used:

(i) N,N'-ethylene bis stearamide=EBS, and
(ii) N,N'-ethylene bis oleamide=EBO.

EXAMPLE 1

The following were placed in the reactor, which was kept flushed with a gentle stream of nitrogen: 2840 ml of solvent followed by 873 g of dry caprolactam, 5 g of EBS and 4 g of finely divided dehydrated silica in succession.

After initiation of agitation at 650 rpm, the vessel was gradually heated to 100° C., and 250 ml of solvent was azeotropically distilled under a vacuum of 200 torr to draw out any trace of water which might have been present.

After the system had been brought back to atmospheric pressure, the anionic catalyst 4.6 g of 80% pure sodium hydride in oil were rapidly added under nitrogen, and the mixture was left under agitation still under a stream of nitrogen for 60 minutes.

Then, using a small metering pump, the selected activator, stearyl isocyanate, was continuously injected into the reaction mixture with the total quantity of isocyanate thus injected being 22.8 g over a period of two hours. At the same time, the temperature was controlled to rise progressively from 110° C. to 135° C. over a period of one hour and was kept at that temperature for another two hours, i.e., one additional hour after introduction of the isocyanate had ended.

Polymerization was then complete. The reactor was then cooled to 90° C., and the sludge of powder+solvent was removed from the bottom.

After spinning and drying, the result was a polyamide-6 powder, particle size between 9 and 19 microns with absolutely no lumping.

This powder had an inherent viscosity of 1.04 and a residual caprolactam content of 900 ppm.

The reactor showed very little fouling and could be immediately re-used for a new polymerization run.

Yield was 100 percent.

EXAMPLE 2

(Comparative)

The procedure was identical to that in Example 1, the only difference being that EBS was not used.

The resulting powder had almost the same lactam content—850 ppm—but its inherent viscosity of 1.26 was higher, as was its particle size (very irregular), which was between 15 and 40 microns.

There were a number of lumps. In addition, the sides of the reactor and the agitator were fouled and required cleaning.

The yield was again 100 percent.

EXAMPLE 3

2840 ml of solvent was placed in the reactor followed by 873 g of lauryllactam, 30 g of EBO and 4.4 g of silica in succession.

The mixture was heated with agitation at 700 rpm to 120° C., then 220 ml of solvent was distilled under a vacuum of 200 torr. After the system had been brought back to atmospheric pressure, 1.75 g of 80% pure sodium hydride was introduced under nitrogen, and the mixture was maintained under nitrogen at 110° C. for 30 minutes. The temperature was reduced to 100° C., and stearyl isocyanate was then gradually added by means of a metering pump according to the following protocol:

(i) 6.3 g of isocyanate for one hour at 100° C., and
(ii) 37.8 g of isocyanate for two hours at 110° C.

After this addition process was finished, the temperature was maintained at 100° C. for one additional hour. The reaction was then complete. After cooling to 90° C., decantation and drying, the resulting polyamide-12 powder showed the following characteristics:

(i) residual lactam content: 650 ppm,
(ii) inherent viscosity: 0.71,
(iii) particle size between 8 and 15 microns: no lumps, and
(iv) the reactor was almost completely clean.

EXAMPLE 4

(Comparative)

A repetition of Example 3 was run, but without the use of EBO, and yielded a powder with the following characteristics:

(i) residual lactam content: 700 ppm,
(ii) inherent viscosity: 0.99, and
(iii) particle size between 20 and 60 microns.

There were a number of lumps in the powder, and the reactor was extensively fouled.

EXAMPLE 5

2840 ml of solvent was placed in the reactor followed by 873 g of lauryllactam, 7 g of EBO and 15 g of silica in succession.

The mixture was heated under agitation at 1000 rpm to 120° C., and 220 ml of solvent was then distilled under a vacuum of 200 torr. After the system had been brought back to atmospheric pressure, 2.7 g of 80% sodium hydride was introduced under nitrogen, and the mixture was kept under nitrogen for 30 minutes at 110° C. The temperature was then reduced to 100° C., after which stearyl isocyanate was gradually added according to the following protocol:

(i) 3.25 g of isocyanate for one hour at 100° C., and
(ii) 9.75 g of isocyanate for three hours at 100° C.

After cooling to 90° C., decantation and drying, the result with a yield of 100 percent was a polyamide-12 powder with the following characteristics:

(i) inherent viscosity: 1.30,
(ii) particle size between 8 and 15 microns: there were no lumps, and
(iii) the reactor was almost completely clean.

Comparing this with Example 3, we note that it was possible to obtain powder with the same particle size (8-15 microns) but with a much higher viscosity (1.30 rather than 0.71) by adjusting the following parameters among others:

(i) the molar ratio between catalyst and activator,
(ii) the duration of the reaction,
(iii) the silica content, and
(iv) the agitation speed;
which were all increased.

EXAMPLE 6

2840 ml of solvent, 654 g of lauryllactam, 218 g of dry titanium oxide, and 5 g of EBS were placed in the reactor. The mixture was agitated at 650 rpm and heated to 100° C. Azeotropic distillation to eliminate 220 ml of solvent was then conducted as in Example 3, and 3.5 g of 80% pure sodium hydride was then added under nitrogen. After 30 minutes at 110° C., the temperature was reduced to 100° C., after which an injection of 8.8 g of stearyl isocyanate over a two-hour period was initiated. The temperature was then raised back to 110° C., and 17.6 g of stearyl isocyanate was again added over a two-hour period. This temperature of 110° C. was maintained for an additional hour, and the mixture was then cooled to 90° C.

After decantation and drying, the resulting white powder had a viscosity of 0.99 and a residual lactam content of 350 ppm.

Its particle size was between 13 and 25 microns. There were no lumps, and the reactor was not fouled, despite the large quantity of titanium dioxide added (25 percent).

EXAMPLE 7

(Comparative)

The same test was carried out as in Example 6, but without EBS, and produced the following results:
(i) inherent viscosity: 1.60, and
(ii) particle size between 15 and 40 microns, numerous lumps, reactor extensively fouled.

EXAMPLE 8

2840 ml of solvent, 261 g of caprolactam, 611 g of lauryllactam, 4 g of silica and 5 g of EBS were placed in the reactor. The mixture was stirred at 720 rpm and heated to 110° C., after which 250 ml of solvent was azeotropically distilled as before under a vacuum of 200 torr. After the system had been brought back to atmospheric pressure, the temperature was lowered to 80° C., and 8.4 g of 80% pure sodium hydride was introduced under nitrogen; the mixture was left under agitation for one hour prior to the addition of 18 g of stearyl isocyanate over a five-hour period through a metering pump. The temperature was kept at 80° C. for the first three hours, and the reaction was then completed by raising the temperature to 110° C. for three hours.

The mixture was then cooled. After decantation and drying, the resulting co-polyamide powder had a viscosity of 0.98 and a particle size between 26 and 42 microns. There was very little fouling of the reactor.

EXAMPLE 9

(Comparative)

The same test was performed as in Example 8, but without EBS, and led to solidification in the reactor between the third and fourth hour of isocyanate injection.

EXAMPLE 10

2840 ml of solvent, 873 g of dodecalactam, 10 g of EBO and 1.5 g of silica were added. As in the preceding tests, 250 ml of solvent was azeotropically distilled under a 200-torr vacuum at 110° C. The mixture was cooled to 100° C., and 1.5 g of 80% sodium hydride was added under nitrogen. After one hour, the stirring speed was set to 350 rpm, and stearyl isocyanate was injected according to the following protocol:

(i) 6.3 g of isocyanate for one hour at 100° C., and
(ii) 37.8 g of isocyanate for three hours at 110° C., after which the temperature was maintained at 120° C. for one hour.

After cooling and drying, the result was a powder with viscosity 0.93 and particle size between 31 and 60 microns with no lumps. The reactor was not fouled.

Comparing this with the results of Example 3, we note that the viscosity and the particle size have been considerably increased by means of adjustments to the following parameters among others: reduction in EBO and silica contents and reduction in the agitation speed.

EXAMPLE 11

(Comparative)

The same test was carried out as in Example 10, but in the absence of EBO, and led to solidification at the beginning of the period at 110° C.

EXAMPLE 12

2840 ml of solvent, 873 g of lauryllactam, 9 g of EBO, and 2 g of silica were added, 250 ml of solvent was distilled azeotropically under 200 torr of vacuum at 110° C., the mixture was cooled to 100° C., and 1.55 g of 80% sodium hydride was added under nitrogen.

After one hour at 100° C., the agitation speed was set to 350 rpm, and stearyl isocyanate was injected according to the following protocol:

(i) 4.12 g of isocyanate for one hour at 100° C., (ii) 12.38 g of isocyanate for three hours at 110° C., and the temperature was then maintained at 120° C. for one hour.

After cooling, decantation and drying, the result was a powder with viscosity 1.22 and particle size between 28 and 52 microns. There were no lumps, and the reactor was not fouled.

Comparing this with Example 10, we note that the product was a polyamide-12 powder with similar particle size but higher viscosity: 1.22 rather than 0.93, obtained by adjusting the following parameters: EBO content which was reduced, silica content which was increased, and catalyst/activator ratio which was increased.

EXAMPLE 13

2840 ml of solvent, 873 g of lauryllactam, 7 g of EBO and 15 g of silica were added, 250 ml of solvent was azeotropically distilled under 200 torr of vacuum at 110° C., the agitation speed was set at 900 rpm, and 2.7 g of 80% sodium hydride was introduced under nitrogen.

13 g of stearyl isocyanate was then injected over a four-hour period at 110° C.

After cooling and drying, the result was a powder with viscosity 1.36 and particle size between 12 and 25 microns. There were no lumps, and the reactor was not fouled.

As compared with Example 12, we note that this test produced a polyamide-12 powder with higher viscosity and considerably smaller particle size by means of reductions in the quantities of EBO and isocyanate, increases in the silica and sodium hydride concentrations, and an increase in agitation speed from 350 to 900 rpm.

The ratio of catalyst (sodium hydride) to activator (isocyanate) was also increased.

While the invention has been described in connection with a preferred embodiument, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for the manufacture of a polyamide powder comprising polymerizing in solution a reaction mixture from which any trace of water has been eliminated and comprising a monomer lactam or lactams capable of generating said polyamide in the presence of an N,N'-alkylene bisamide, an activator, a solvent, a catalyst, and a finely-divided inert material to generate crystallization nuclei.

2. The process of claim 1, wherein the N,N'-alkylene bisamide is a fatty-acid N,N'-alkylene bisamide.

3. The process of claim 2, wherein the N,N'-alkylene bisamide is selected from N,N'-ethylene bis-stearamide or N,N'ethylene bis-oleamide.

4. The process of claims 1, 2, or 3, wherein the quantity of N,N'-alkylene bisamide added is between about 0.001 and 4 moles per 100 moles of lactam.

5. The process of claims 1, 2, or 3, wherein, depending on the quantity of N,N'-alkylene bisamide, the temperature of the reaction mixture is raised to increase the molecular weight of the powder and the size of its particles.

6. The process of claims 1, 2, or 3, wherein, depending on the quantity of N,N'-alkylene bisamide, the quantity of catalyst is increased to increase the molecular weight of the powder and its particle size.

7. The process of claim 1, wherein

8. The process of claim 7, wherein, depending on the quantity of N,N'-alkylene bisamide, the ratio between the quantity of catalyst and the quantity of activator is increased to increase the molecular weight of the powder and its particle size.

9. The process of claims 7 or 8, wherein the molecular weight to the powder and its particle size are decreased by decreasing the rate at which the activator is injected into the reaction mixture.

10. The process of claims 7 or 8, wherein the size of the powder particles is reduced by increasing the agitation speed and vice persa.

11. The process of claims 7 or 8, wherein the size of the powder particles is reduced by increasing the quantity of finely-divided inert substance and vice versa.

* * * * *

UNITED STATES PATENT AND TRADEMARK OFFICE
CERTIFICATE OF CORRECTION

PATENT NO. : 4,694,063
DATED : September 15, 1987
INVENTOR(S) : Hilaire et al

It is certified that error appears in the above-identified patent and that said Letters Patent are hereby corrected as shown below:

Claim 7 (Column 8, line 29) after "wherein" insert
--the activator is injected into the reaction mixture under agitation.--

Claim 10 (Column 8, line 41) "persa" should read --versa--.

Signed and Sealed this

Nineteenth Day of April, 1988

Attest:

DONALD J. QUIGG

Attesting Officer

Commissioner of Patents and Trademarks